United States Patent

[11] 3,628,836

[72] Inventors Richard C. Mulready
Jupiter;
William E. Creslein, III, Juno, both of Fla.
[21] Appl. No. 4,499
[22] Filed Dec. 17, 1969
[45] Patented Dec. 21, 1971
[73] Assignee United Aircraft Corporation
East Hartford, Conn.

[54] ROLLER BEARING
5 Claims, 2 Drawing Figs.
[52] U.S. Cl........................................... 308/184
[51] Int. Cl............................................ F16c 17/00
[50] Field of Search.............................. 308/187, 184

[56] References Cited
UNITED STATES PATENTS
1,356,766 10/1920 Hindle........................ 308/184

FOREIGN PATENTS
342,800 11/1959 Germany........................ 308/184
493,756 5/1919 France........................... 308/184

Primary Examiner—Edgar W. Geoghegan
Assistant Examiner—Frank Susko
Attorney—Jack N. McCarthy ABSTRACT: A shaft is mounted in a housing by a roller bearing assembly. This assembly comprises an inner race, rollers, and an outer race. A tight or negative fit exists between the inner race, rollers, and outer race around the entire circumference of the assembly. The inner race is fixed to the shaft and includes side rails extending therefrom which are spaced from the ends of the rollers. The outer race is thin and mounted in the housing so that it can flex under roller load and provide damping. A nut provides for varying the compressive force on the outer race if desired.

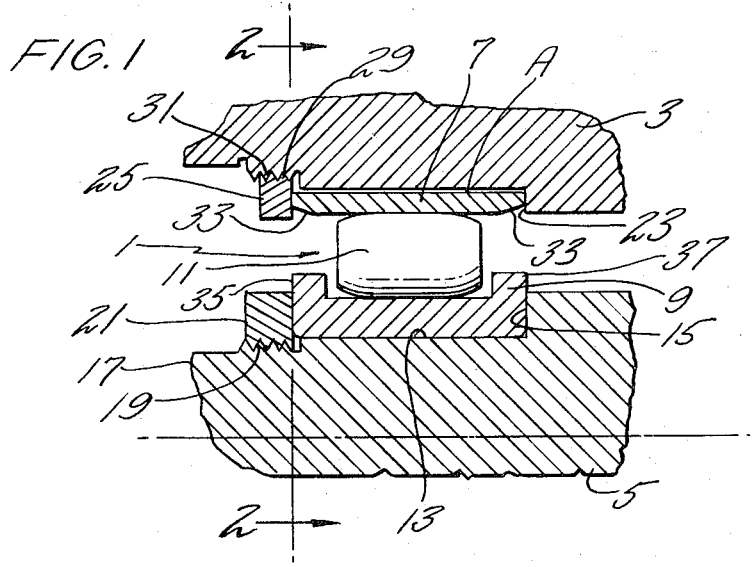
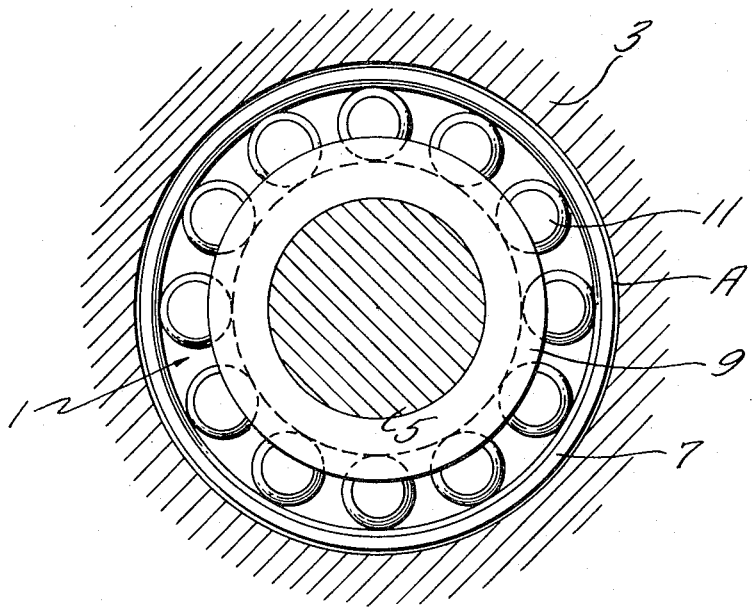
INVENTORS
RICHARD C. MULREADY
WILLIAM E. CRESLEIN III
BY Jack N. McCarthy
AGENT

ROLLER BEARING

BACKGROUND OF THE INVENTION

This invention relates to roller bearing assemblies and particularly to their use in high speed applications.

SUMMARY OF THE INVENTION

A primary object of the present invention is to provide an improved roller bearing assembly that eliminates unloaded zones in a bearing, increases the bearing radial spring rate, reduces the roller skidding and skewing, and reduces the roller end wear.

In accordance with the present invention, there is a tight or negative fit between the inner race, rollers, and outer race around the entire circumference of the assembly. One race is thin and is mounted so that it can flex under roller load.

The combination of the thin outer race and negative internal clearance between the rollers and both races has the advantage that at operating speeds, the unloaded zones normally experienced in a roller bearing are eliminated. This increases the radial spring rate of the bearing. Because the unloaded zones are eliminated, the magnitude of the variation in compressive stress that the roller experiences as it passes through the loaded and unloaded zones of the bearing is reduced. This improves the fatigue life of the rollers. Elimination of the unloaded zones also reduces or eliminates roller skidding and skewing that occurs as the roller passes through these zones.

In accordance with a further aspect of the present invention, one race containing the rollers has side rails and a clearance is provided between the ends of the rollers and the side rails when assembled.

The thin outer race when installed over the rollers with a negative internal clearance tends to conform to the roller end drop or end radius, providing roller guiding similar to that of a crown pulley and belt. As a result of this roller guidance, the roller end to side rail clearance that is normally held to approximately 0.0015 inches to provide roller guidance can be increased so that contact between the roller ends and side rails does not occur. This eliminates roller end wear that occurs, especially in some nonlubricated bearing applications.

This invention permits a varying control of the compressive force placed on the thin race so as to vary the damping effect.

In accordance with the present invention, bearing assemblies of moderate size (55 mm. × 100 mm.) have been made to run at or above speeds of 48,000 r.p.m. with moderate radial loads (approximately 1700 pounds) in cryogenic environments for periods in excess of 15 hours.

BRIEF DESCRIPTION OF THE DRAWINGS

FIG. 1 is a sectional view taken longitudinally through one side of a roller bearing assembly showing the invention.

FIG. 2 is a sectional view of the whole roller bearing assembly taken along the line 2-2.

DESCRIPTION OF THE PREFERRED EMBODIMENT

Referring to FIG. 2, a roller bearing assembly 1 is shown mounted in a housing 3 supporting a shaft 5. The roller bearing 1 comprises a thin outer race 7, and inner race 9, and a plurality of rollers 11. A cage can be used to position the rollers; however, this is omitted for the sake of clarity.

The inner race 9 is mounted on the surface of a necked down portion 13 of shaft 5. An annular abutment 15 extends between the surface of portion 13 and the outer surface of the shaft. The inner race is positioned with one end against said abutment, and the portion of the shaft 17 extending away from the necked down portion 13 is threaded at 19 to receive an annular type nut 21. The nut 21 is tightened to fixedly hold the inner race in position. In an actual bearing construction, the fit between the surface of the reduced portion 13 and the inner surface of the inner race would be tight. In one configuration rebuilt, the fit was held from 0.0022 inches to 0.0035 inches tight.

The outer race 7 is thin and is mounted within the housing 3 around the inner race. The outer race has one end positioned against a fixed abutment 23 on the housing, which is annular, and as shown, is substantially aligned with annular abutment 15 on the shaft. The other end abuts the side of an annular nut 25 which has outer threads 29 engaging internal threads 31 in the housing. The annular nut 25 can be tightened or loosened as desired to vary compressive forces acting on the outer race 7. The deflected shape of the outer race 7 due to nut 25 will aid in guiding the rollers. Any means desired can be used to lock the annular nut 25 in place. In an actual bearing construction the fit between the outer surface of the outer race and the inner surface of the housing adjacent thereto would be loose, as shown by the space A. In one construction built, this fit was held from 0.0018 inches to 0.0016 inches loose. This can be varied in accordance to the usage to which the bearing is put, but the space must be such that the race will not abut the housing at operating speeds and temperatures. However, a stop can be used to provide an upper limit on deflection. The torque on this nut is figured to prevent rotation of the outer race and to add damping to the system as radial movement of the race occurs. In one configuration built, the radial spring rate of the system was $3.5 \times 10^6$ lb./in.

A plurality of rollers 11 are mounted between the inner and outer race and have a symmetrical tight loading around the entire circumference of the roller bearing. In one configuration tested, the rollers were cylindrical and were the same length as the diameter (L/D=1.0). The cylindrical cross section was maintained for approximately 50 percent of the roller length at the center of the roller and then a roller end radius was incorporated. In one configuration built, the clearance between the rollers 11 and the outer and inner races, 7 and 9, was 0.001 inches tight (a negative clearance). Further, in other configurations tested, this clearance varied from 0.0005 inches to 0.005 inches tight.

The inner surface of the outer race 7 is flat except for beveled off portions 33 at the outer edges. The outer surface of the inner race 9 is formed having side rails 35 and 37. The distance between the inner sides of these side rails 35 and 37 is greater than the width of the rollers 11. This provides a space between the roller ends and the side rails. In one configuration built, the roller end clearance for a side rail was made 0.04 inches.

In case a bearing of this type is run at high temperatures, it may be necessary to provide additional cooling to the bearing inner race to prevent thermal cracks occuring in the side rails. This arrangement could provide for a coolant to flow directly through the bearing between the inner and outer races from one side to the other.

We claim:

1. In combination, a first member and second member being spaced radially apart for relative rotation therebetween, a roller bearing assembly including an inner race and an outer race with rollers disposed between the races, one of said races being thin and spaced from its cooperating first member, the other of said races being positioned on said second member, said rollers being formed having a curved inward taper at each end, said inner and outer races and said rollers all having a tight fit around the entire circumference, said tight fit tending to conform said thin race to the roller end taper.

2. A combination as set forth in claim 1 wherein the other of said races has outer side rails, said side rails being spaced from the ends of the rollers by at least 0.04 inches.

3. A combination as set forth in claim 1 wherein one race has one end positioned against an abutment on one of said members and the other of said races has one end against an abutment of the other of said members, one of said races having outer side rails.

4. A combination as set forth in claim 1 wherein means are provided for varying the axial force on said one thin race to vary the radial spring rate thereof.

5. A combination as set forth in claim 1 wherein the tight fit lies in a range of from 0.0005 inches to 0.005 inches tight, a negative clearance.